US011084960B2

(12) United States Patent
Saito et al.

(10) Patent No.: US 11,084,960 B2
(45) Date of Patent: Aug. 10, 2021

(54) CURABLE EPOXIDE COMPOSITION

(71) Applicant: T&K TOKA CO., LTD., Saitama (JP)

(72) Inventors: Akinobu Saito, Saitama (JP); Shuichi Watanabe, Saitama (JP); Takakuni Kawano, Saitama (JP); Shuichi Matakawa, Saitama (JP)

(73) Assignee: T&K TOKA CO., LTD., Saitama (JP)

( * ) Notice: Subject to any disclaimer, the term of this patent is extended or adjusted under 35 U.S.C. 154(b) by 0 days.

(21) Appl. No.: 16/634,300

(22) PCT Filed: May 17, 2019

(86) PCT No.: PCT/JP2019/019626
§ 371 (c)(1),
(2) Date: Jan. 27, 2020

(87) PCT Pub. No.: WO2019/221262
PCT Pub. Date: Nov. 21, 2019

(65) Prior Publication Data
US 2020/0231850 A1    Jul. 23, 2020

(30) Foreign Application Priority Data
May 17, 2018    (JP) .............................. JP2018-095320

(51) Int. Cl.
*C09J 163/04* (2006.01)
*C08G 59/24* (2006.01)
*C08G 59/40* (2006.01)
*C08K 3/04* (2006.01)
*C08K 3/36* (2006.01)
*C08K 5/21* (2006.01)
*C08K 5/3445* (2006.01)
*C08K 5/521* (2006.01)
*C08K 5/524* (2006.01)
*C08K 7/06* (2006.01)

(52) U.S. Cl.
CPC .......... *C09J 163/04* (2013.01); *C08G 59/245* (2013.01); *C08G 59/4021* (2013.01); *C08K 3/04* (2013.01); *C08K 3/36* (2013.01); *C08K 5/21* (2013.01); *C08K 5/3445* (2013.01); *C08K 5/521* (2013.01); *C08K 5/524* (2013.01); *C08K 7/06* (2013.01); *C08K 2201/003* (2013.01); *C08K 2201/004* (2013.01); *C09J 2463/00* (2013.01)

(58) Field of Classification Search
CPC ..................................................... C09J 163/04
See application file for complete search history.

(56) References Cited

U.S. PATENT DOCUMENTS

| 5,138,018 | A | 8/1992 | Tashiro et al. |
| 5,200,494 | A | 4/1993 | Kubota et al. |
| 2009/0192265 | A1* | 7/2009 | Hasegawa ............... C08L 67/07 |
| | | | 525/101 |
| 2011/0319525 | A1* | 12/2011 | Maeda .................... C08L 71/00 |
| | | | 523/452 |
| 2015/0094400 | A1 | 4/2015 | Zheng et al. |
| 2015/0175816 | A1 | 6/2015 | Deogon et al. |
| 2017/0298199 | A1 | 10/2017 | Akiyama et al. |

FOREIGN PATENT DOCUMENTS

| CN | 1942515 | A | 4/2007 |
| CN | 102449018 | A | 5/2012 |
| CN | 103168074 | A | 6/2013 |
| EP | 0568354 | A1 | 11/1993 |
| JP | H03177418 | A | 8/1991 |
| JP | H03296525 | A | 12/1991 |
| JP | H0616975 | A | 1/1994 |
| JP | 2011246590 | A | 12/2011 |
| JP | 2015529714 | A | 10/2015 |
| JP | 2016504476 | A | 2/2016 |
| JP | 2016532000 | A | 10/2016 |
| JP | 2017218573 | A | 12/2017 |
| WO | 2016039326 | A1 | 3/2016 |

OTHER PUBLICATIONS

International Search Report and Written Opinion (and English translation) for International Application No. PCT/JP2019/019626 (dated Aug. 13, 2019).

* cited by examiner

*Primary Examiner* — Daniel H Lee
(74) *Attorney, Agent, or Firm* — Heslin Rothenberg Farley & Mesiti P.C.

(57) ABSTRACT

An object of the present invention is to provide a composite material including an epoxide resin, having an improved strength. The object can be solved by a curable epoxide composition comprising an epoxide compound; a carbon fiber; a curing agent; and phosphite ester or phosphate ester. According to the present invention, a strength of the curable epoxide composition comprising a carbon fiber can be improved.

4 Claims, No Drawings

CURABLE EPOXIDE COMPOSITION

CROSS REFERENCE TO RELATED APPLICATIONS

This application is a national stage filing under 35 U.S.C. § 371 of PCT Application No. PCT/JP2019/019626, filed on May 17, 2019, which claims priority of Japanese Application No. 2018-095320, filed on May 17, 2018, which is hereby incorporated by reference in its entirety.

TECHNICAL FIELD

The present invention relates to a curable epoxide composition. According to the present invention, a strength of the curable epoxide composition comprising a carbon fiber can be improved.

BACKGROUND ART

Carbon fiber has excellent properties such as high strength, high elastic modulus, and high conductivity, and is used in various composite materials. As a matrix resin to be composited with the carbon fiber, there may be mentioned thermosetting resins and thermoplastic resins. For example, fiber reinforced plastic (FRP) can be obtained by adding fiber to thermosetting resin such as unsaturated polyester resin, vinyl ester resin, epoxy resin, or phenol resin.

Specifically, patent literature 1 exemplifies carbon fiber as a fiber to be contained in a composite material comprising an epoxy resin.

CITATION LIST

Patent Literature

[Patent literature 1] Japanese Translation Publication (Kohyo) No. 2016-504476
[Patent literature 2] Japanese Translation Publication (Kohyo) No. 2016-532000
[Patent literature 3] Japanese Unexamined Patent Publication (Kokai) No. 3-177418
[Patent literature 4] Japanese Unexamined Patent Publication (Kokai) No. 3-296525

SUMMARY OF INVENTION

Technical Problem

On the other hand, patent literature 2 exemplifies carbon fiber as a reinforcing fiber to be contained in a liquid curable epoxide composition. It is considered that the addition of carbon fiber increases the strength of the composite material obtained from the epoxide composition. However, further improvement in strength is expected.

Accordingly, an object of the present invention is to provide a composite material including an epoxide resin, having an improved strength.

Solution to Problem

The present inventors found that by adding a phosphite ester or a phosphate ester to a liquid curable epoxide composition containing carbon fiber, the physical properties of a cured product obtained by curing are improved.

The present invention is based on the above findings.
Accordingly, the present invention relates to:
[1] a curable epoxide composition, comprising an epoxide compound; a carbon fiber; a curing agent; and phosphite ester or phosphate ester,
[2] the curable epoxide composition of the item [1], wherein an average fiber length of the carbon fiber is 20 μm to 1 mm,
[3] the curable epoxide composition of the item [1] or [2], wherein an amount of phosphite ester or phosphate ester is 2 to 40% by weight,
[4] the curable epoxide composition of any one of the items [1] to [3], further comprising a humed silica and/or a rheological agent
[5] a coating material comprising the curable epoxide composition of any one of the items [1] to [4],
[6] an adhesive comprising the curable epoxide composition of any one of the items [1] to [4],
[7] a molded body comprising the curable epoxide composition of any one of the items [1] to [4].

Advantageous Effects of Invention

According to the liquid curable epoxide composition, the cured product (composite material) obtained from the liquid curable epoxide composition exhibits excellent flexural modulus or flexural strength.

DESCRIPTION OF EMBODIMENTS

The curable epoxide composition of the present invention comprises an epoxide compound; a carbon fiber; a curing agent; and phosphite ester or phosphate ester.

<<Epoxide Composition>>

The epoxide compound used in the present invention is not particularly limited, but is preferably an epoxide compound used in the curable epoxide composition. Specifically, it is preferably an epoxide compound having one or more epoxy group on average in the molecule thereof, and more specifically it is an epoxy resin having more than one epoxy group on average in the molecule thereof. The number of epoxy group is not particularly limited so long as it is one or more on average, but preferably two or more. The upper limit of the epoxy group is not particularly limited, in view of an effect of epoxy resin on epoxy resin composition. The term "average" means the average number of epoxy groups in one molecule when two or more epoxy resins are mixed.

Specifically, the epoxide compound includes, for example, glycidyl ethers obtained by reacting epichlorohydrin with a polyhydric phenol such as bisphenol A, bisphenol F, bisphenol S, hexahydrobisphenol A, tetramethylbisphenol A, tetramethylbisphenol F, catechol, resorcinol, cresol novolak, tetrabromobisphenol A, trihydroxybiphenyl, bis-resorcinol, bisphenol hexafluoroacetone, hydroquinone, or bixylenol; polyglycidyl ethers obtained by reacting epichlorohydrin with an aliphatic polyhydric alcohol such as glycerin, neopentyl glycol, ethylene glycol, propylene glycol, butylene glycol, hexylene glycol, polyethylene glycol, polypropylene glycol; glycidyl ether esters obtained by reacting epichlorohydrin with a hydroxycarboxylic acid such as p-hydroxybenzoic acid, beta-hydroxynaphthalene carboxylic acid; polyglycidyl esters obtained from a polycarboxylic acid such as phthalic, methylphthalic, isophthalic, telephthalic, tetrahydrophthalic, hexahydrophthalic, endomethylenetetrahydrophthalic, endomethylenehexahydrophthalic, trimellitic or polymerized fatty acid; glycidylaminoglycidyl ethers obtained from aminophenol or aminoalkylphenol; glycidylaminoglycidyl ester obtained from aminobenzoic acid; glycidylamines obtained from aniline, toluidine, tribromoaniline, xylylenediamine, diaminocyclohexane, bisaminomethylcyclohexane, 4,4'-diaminodiphenylmethane, 4,4'-diaminodiphenyl sulfone or the like; epoxypolyolefin; glycidylhydantoin; glycidylalkylhydantoin; triglycidyl cyanulate; or mono-epoxide represented by butylglycidyl ether, phenylglycidyl ether, alkylphenylglycidyl ether, glycidyl ester of benzoic acid, stylene oxide or the like, and one or a mixture of two or more thereof may be used.

An amount of the epoxide compound in the curable epoxide composition is not particularly limited, but, for example, 25 to 95% by weight, preferably 30 to 90% by weight, most preferably 35 to 85% by weight. The curable epoxide composition can be efficiently cured, when the amount of the epoxide compound is within the above range.

<<Carbon Fiber>>

The carbon fiber use in the present invention is not particularly limited, so long as it can increase the strength of the product (such as a composite material, molded body, adhesive, and coating material) which is finally obtained. The carbon fibers include PAN-based carbon fibers made from polyacrylonitrile resin, rayon-based carbon fibers made from rayon, or pitch-based carbon fibers made from pitch.

An average fiber diameter of the carbon fiber is not particularly limited, but generally 3 to 30 µm, preferably 4 to 20 µm, more preferably 5 to 10 µm. Further, an average fiber length is not particularly limited. In the present invention, for example, the carbon fiber having 20 µm to 10 mm may be used, but it is preferably 20 to 1000 µm, more preferably 40 to 500 µm, even preferably 50 to 300 µm.

The average fiber length and average fiber diameter of the carbon fiber may be measured by using a general method used in this field. In particular, the carbon fibers are magnified by a magnifying glass or an image analyzer, and the fiber diameter or fiber length of about 10 to 1000 of arbitrarily selected carbon fibers is measured. Then, by calculating the average, the average fiber diameter and average fiber length of the carbon fiber can be measured.

An amount of the carbon fiber is not particularly limited, but is, for example, 1 to 40% by weight, preferably 10 to 35% by weight, most preferably 15 to 30% by weight. The strength of the coating material, adhesive, or molded body obtained by using the epoxide compound of the present invention can be increased, when the amount of the carbon fiber is within the above range.

<<Curing Agent>>

The curing agent contained in the curable epoxide composition of the present invention is not particularly limited, so long as they are curing agents other than imidazole-based curing agent. There may be mentioned modified polyamines such as an epoxy adduct, a Mannich reactant, a Michael reactant, a urea reactant, a thiourea reactant; polyamide polyamines; polythiols; dicyandiamide; dibasic dihydrazide; guanamines; acid anhydride; or melamine. Specifically, modified polyamines, polyamide polyamines or polythiols are preferable, from the viewpoint of low-temperature curing. These curing agents can be prepared by known methods.

The epoxy modified polyamines include a compound obtained by mixing or reacting a compound in which N, N-dialkylaminoalkylamine is modified with an epoxy compound, with a phenol resin and/or a polyhydric phenol compound. The urea-modified polyamines include a compound in which N, N-dialkylaminoalkylamine is modified with urea (Patent literature 3), or a compound in which N, N-dialkylaminoalkylamine is modified with isocyanate (Patent literature 4). The thiourea-modified polyamines include a compound in which N, N-dialkylaminoalkylamine is modified with thiourea, or a compound in which N, N-dialkylaminoalkylamine is modified with isothiocyanate.

In the present invention, the curing agent(s) may be used alone or in combination of two or more.

An amount of the curing agent in the curable epoxide composition of the present invention is not particularly limited, and it may be appropriately determined according to the type of the curing agent. The amount of the curing agent is, for example, 2 to 50% by weight, in one embodiment, 5 to 30% by weight, and in one embodiment, 10 to 20% by weight.

The curable epoxide composition of the present invention further comprises a curing accelerator. The curing accelerator includes a tertiary amine compound, a phosphine compound, an imidazole compound or the like.

<<Phosphite Ester or Phosphate Ester>>

The curable epoxide composition of the present invention comprises phosphite ester or phosphate ester.

As the phosphite ester, there may be mentioned phosphite monoester, phosphite diester, or phosphite triester. More specifically, there may be mentioned monomethyl phosphite, dimethyl phosphite, trimethyl phosphite, monoethyl phosphite, diethyl phosphite, triethyl phosphite, monobutyl phosphite, dibutyl phosphite, tributyl phosphite, monolauryl phosphite, dilauryl phosphite, trilauryl phosphite, monooleyl phosphite, dioleyl phosphite, trioleyl phosphite, monophenyl phosphite, diphenyl phosphite, triphenyl phosphite, mononaphthyl phosphite, dinaphthyl phosphite, trinaphthyl phosphite, di-o-tolyl phosphite, di-m-tolyl phosphite, di-p-tolyl phosphite, di-p-chlorophenyl phosphite, di-p-bromophenyl phosphite, di-p-fluorophenyl phosphite, or the like, and one or a mixture of two or more thereof may be used.

As the phosphate ester, there may be mentioned monoester phosphate, diester phosphate, or triester phosphate. More specifically, there may be mentioned monomethyl phosphate, dimethyl phosphate, trimethyl phosphate, monoethyl phosphate, diethyl phosphate, triethyl phosphate, monobutyl phosphoric, dibutyl phosphate, tributyl phosphate, monolauryl phosphate, dilauryl phosphate, trilauryl phosphate, monooleyl phosphate, dioleyl phosphate, trioleyl phosphate, monophenyl phosphate, diphenyl phosphate, triphenyl phosphate, mononaphthyl phosphate, dinaphthyl phosphate, trinaphthyl phosphate, di-o-tolyl phosphate, di-m-tolyl phosphate, di-p-tolyl phosphate, di-p-chlorophenyl phosphate, di-p-bromophenyl phosphate, di-p-fluorophenyl phosphate, or the like, and one or a mixture of two or more thereof may be used.

An amount of phosphite ester or phosphate ester in the curable epoxide composition is not particularly limited, but preferably 4 to 30% by weight, more preferably 5 to 25% by weight, most preferably 6 to 23% by weight.

The resulting cured product exhibits excellent flexural modulus or flexural strength, when the amount of phosphite ester or phosphate ester is within the above range <<Silica>>

The curable epoxide composition of the present invention may comprise silica.

A type of the silica is not particularly limited. There may be mentioned a humed silica, or a silica by wet method (such as a precipitated silica or a silica gel), but preferably humed silica. By adding silica, a mechanical property of the resulting cured product (composite material) can be improved, and a rheological property of the curable epoxide composition can be adjusted.

The humed silica is not particularly limited, so long as it is obtained by a flame hydrolysis method (combustion hydrolysis method). The humed silica can be prepared by flame-hydrolyzing silicon tetrachloride ($SiCl_4$) continuously.

(Hydrophilic Humed Silica)

The silica obtained by the flame hydrolysis method has a hydroxyl group (Si—OH) on the surface and is hydrophilic. The hydrophilic humed silica may be used in the epoxide composition of the present invention.

(Hydrophobic Humed Silica)

The hydrophobic humed silica used in the present invention can be obtained, for example, by chemically treating the hydrophilic humed silica obtained by the flame hydrolysis method (combustion hydrolysis method), with silane or siloxane.

An average particle diameter of the humed silica is not particularly limited, as long as the effect of the present invention can be achieved, but is 5 to 50 nm, preferably 7 to 40 nm, more preferably 10 to 25 nm.

Specifically, as the hydrophobic humed silica, there may be mentioned R972, R974, R104, R106, R202, R208, R805, R812, R812S, R816, R7200, R8200, R9200, R711, RY50, NY50, NY50L, RY200, RY200S, RX50, NAX50, RX200, RX300, R504, NX90S, NX90G, RX300, REA90, REA200, RY51, NA50Y, RA200HS, NA50H, NA130K, NA200Y, NX130, RY200L, R709, or R976S from Nippon Aerosil Co., Ltd.

An amount of the silica in the epoxide composition is not particularly limited, but preferably 0.25 to 4% by weight. Further, the amount of silica is 0.3 to 4 parts by weight with respect to 100 parts by weight of total of epoxide compound and carbon fiber.

<<Rheological Agent>>

The curable epoxide composition of the present invention may comprise a rheological agent. The rheological agent is not particularly limited as long as the effect of the present invention can be achieved, but, for example, there may be mentioned fatty amide, ethylenebisstearylamide, hexamethylenebishydroxystearylamide, modified urea, or urea modified polyamide. The rheological agent of modified urea includes BYK-7410ET, BYK-410, BYK-410D, BYK-7411ES, BYK-411, BYK-7420ES, or BYK-420 (BYK Chemie Japan K.K.).

(Other Additives)

Other components commonly used in this field can be added to the curable epoxide compound composition of the present invention, as long as the effects of the present invention are not impaired. Specifically, for example, there may be mentioned a polyimide resin, a polyester resin, a polyamide resin, or a resin such as a polyamideimide resin; a flame retardant, an antioxidant, an antifoaming agent, a leveling agent, or the like.

<<Function>>

Although the mechanism by which the cured product obtained from the curable epoxide composition of the present invention exhibits excellent flexural modulus or flexural strength has not been specifically determined but may be as follows. However, the present invention is not limited by the following explanation.

The curable epoxide composition can increase the strength of the obtained composite material by containing the carbon fiber. The curable epoxide composition of the present invention comprises phosphate ester or phosphite ester.

It is considered that the phosphate ester or phosphite ester is present at the interface between the carbon fiber and the matrix resin formed from the carbon fiber and epoxide. Then, it is presumed that phosphate ester or phosphite ester improves the flexural modulus or flexural strength of the obtained cured product by improving the adhesion between the carbon fiber and the matrix resin.

EXAMPLES

The present invention now will be further illustrated by, but is by no means limited to, the following Examples.

Example 1

Bisphenol A diglycidyl ether (80 parts by weight), a milled carbon fiber (20 parts by weight), and triphenyl phosphite (10 parts by weight) were blended and mixed by stirring for 1 hour at room temperature using a planetary mixer (PLM-2, INOUE MFG., INC), to thereby prepare an epoxy composition in which milled carbon fibers were dispersed. Then, TXE-415A (16 parts by weight; polyaminoamide, T&K TOKA Co. Ltd.) was added to the resulting composition and the whole was mixed to thereby prepare a curable epoxide composition in which milled carbon fibers were dispersed. The viscosity, flexural modulus, and flexural strength of the resulting molded body were measured as follows.

<<Viscosity>>

The viscosity at 25° C. was measured using a cone-plate type viscometer.

<<Flexural Modulus and Flexural Strength>>

The obtained formulation was applied to a mold and was heated stepwise at 60° C. for 1 hour and 150° C. for 1 hour, to thereby prepare a piece for flexural test (80×10×4 mm) in accordance with JIS K7171. The obtained test piece was subjected to a bending test (test speed: 2 mm/min) using a universal tensile tester (Autograph AGS-X; Shimadzu Corporation).

Example 2

The procedure described in Example 1 was repeated except for further adding Aerosil R927 (0.5 parts by weight), to obtain a molded body.

Example 3

The procedure described in Example 2 was repeated except for further adding ethylenebisstearylamide (0.5 parts by weight), to obtain a molded body.

Example 4

The procedure described in Example 3 was repeated except that hexamethylenebishydroxystearylamide (0.25 parts by weight) is used instead of ethylenebisstearylamide (0.5 parts by weight), to obtain a molded body.

Example 5

The procedure described in Example 3 was repeated except that BYK7410ET (0.5 parts by weight) is used instead of ethylenebisstearylamide (0.5 parts by weight), to obtain a molded body.

Example 6

The procedure described in Example 5 was repeated except that the amount of triphenyl phosphite was 15 parts by weight instead of 10 parts by weight, to obtain a molded body.

Example 7

The procedure described in Example 5 was repeated except that the amount of triphenyl phosphite was 20 parts by weight instead of 10 parts by weight, to obtain a molded body.

Example 8

The procedure described in Example 5 was repeated except that the amount of triphenyl phosphite was 30 parts by weight instead of 10 parts by weight, to obtain a molded body.

Example 9

The procedure described in Example 5 was repeated except that triphenyl phosphate was used instead of triphenyl phosphite, to obtain a molded body.

Example 10

The procedure described in Example 5 was repeated except that tricresyl phosphate was used instead of triphenyl phosphite, to obtain a molded body.

Comparative Example 1

The procedure described in Example 5 was repeated except that the amount of bisphenol A diglycidyl ether was 100 parts by weight instead of 80 parts by weight, carbon fibers were not added, the amount of TXE-415A was 20 parts by weight instead of 16 parts by weight, and triphenyl phosphite was not added, to obtain a molded body.

Comparative Example 2

The procedure described in Example 5 was repeated except that triphenyl phosphite was not added, to obtain a molded body.

Example 11

The procedure described in Example 5 was repeated except that dicyandiamide (6.4 parts by weight) was used as the curing agent instead of TXE-415A, and a curing accelerator (5.6 parts by weight; Fujicure1121; T&K TOKA Co. Ltd) was used, to obtain a molded body.

Example 12

The procedure described in Example 11 was repeated except that the amount of triphenyl phosphite was 15 parts by weight instead of 10 parts by weight, to obtain a molded body.

Example 13

The procedure described in Example 11 was repeated except that the amount of triphenyl phosphite was 20 parts by weight instead of 10 parts by weight, to obtain a molded body.

Example 14

The procedure described in Example 11 was repeated except that triphenyl phosphate was used instead of triphenyl phosphite, to obtain a molded body.

Example 15

The procedure described in Example 11 was repeated except that tricresyl phosphate was used instead of triphenyl phosphite, to obtain a molded body.

Comparative Example 3

The procedure described in Example 11 was repeated except that the amount of dicyandiamide was 8 parts by weight instead of 6.4 parts by weight, the amount of Fujicure was 7 parts by weight instead of 5.6 parts by weight, the amount of bisphenol A diglycidyl ether was 100 parts by weight instead of 80 parts by weight, carbon fibers were not added, and triphenyl phosphite was not added, to obtain a molded body.

Comparative Example 4

The procedure described in Example 11 was repeated except that triphenyl phosphite was not added, to obtain a molded body.

TABLE 1

| | Unit | Comp. Example 1 | Comp. Example 2 | Example 1 | Example 2 | Example 3 | Example 4 | Example 5 | Example 6 | Example 7 | Example 8 | Example 9 | Example 10 |
|---|---|---|---|---|---|---|---|---|---|---|---|---|---|
| Bisphenol A diglycidyl ether | g | 100 | 80 | 80 | 80 | 80 | 80 | 80 | 80 | 80 | 80 | 80 | 80 |
| Milled carbon fiber[1] | g | 0 | 20 | 20 | 20 | 20 | 20 | 20 | 20 | 20 | 20 | 20 | 20 |
| BYK7410ET[2] | g | 0.5 | 0.5 | | | | | 0.5 | 0.5 | 0.5 | 0.5 | 0.5 | 0.5 |
| Ethylenebisstearylamide[3] | | | | | | 0.5 | | | | | | | |
| Hexamethylenebishydroxy-stearylamide[3] | | | | | | | 0.25 | | | | | | |
| Aerosil R927[4] | g | 0.5 | 0.5 | | 0.5 | 0.5 | 0.5 | 0.5 | 0.5 | 0.5 | 0.5 | 0.5 | 0.5 |
| TXE-415A[5] | g | 20 | 16 | 16 | 16 | 16 | 16 | 16 | 16 | 16 | 16 | 16 | 16 |
| Triphenyl phosphite | g | | | 10 | 10 | 10 | 10 | 10 | 15 | 20 | 30 | | |
| Triphenyl phosphate | | | | | | | | | | | | 10 | |
| Tricresyl phosphate | | | | | | | | | | | | | 10 |

TABLE 1-continued

|  | Unit | Comp. Example 1 | Comp. Example 2 | Example 1 | Example 2 | Example 3 | Example 4 | Example 5 | Example 6 | Example 7 | Example 8 | Example 9 | Example 10 |
|---|---|---|---|---|---|---|---|---|---|---|---|---|---|
| Viscosity/25° C. | Pa·s | 22.7 | 39.3 | 10.9 | 10.8 | 11.8 | 13.2 | 17.8 | 12.6 | 10.3 | 6.0 | 22.5 | 20.6 |
| Flexural modulus[6] | GPa | 2.4 | 6.1 | 7.0 | 6.9 | 8.0 | 8.2 | 8.9 | 9.0 | 8.9 | 7.5 | 7.8 | 8.1 |
| Flexural strength[6] | MPa | 66 | 127 | 140 | 145 | 160 | 164 | 165 | 174 | 164 | 109 | 138 | 142 |

[1] PAN based, Fiber diameter 7 μm, Average fiber length 100 μm
[2] Urea-modified liquid rheological agent
[3] Fatty amide (Thixotropic agent) Fatty amide manufactured by Mitsubishi Chemical (Nihon Kaset) Ethylenebisstearylamide (Slipacks E). Hexamethylenebishydroxystearylamide (Slipacks ZHH)
[4] Hydrophobic fumed silica (Average diameter of primary particle: about 16 nm)
[5] Amide-based curing agent manufactured by T & K TOKA
[6] Curing conditions: 60° C. × 1 hr→150° C. × 1 hr

TABLE 2

|  | Unit | Comp. Example 3 | Comp. Example 4 | Example 11 | Example 12 | Example 13 | Example 14 | Example 15 |
|---|---|---|---|---|---|---|---|---|
| Bisphenol A diglycidyl ether | g | 100 | 80 | 80 | 80 | 80 | 80 | 80 |
| Milled carbon fiber[1] | g |  | 20 | 20 | 20 | 20 | 20 | 20 |
| BYK7410ET[2] | g | 0.5 | 0.5 | 0.5 | 0.5 | 0.5 | 0.5 | 0.5 |
| Aerosil R927[4] | g | 0.5 | 0.5 | 0.5 | 0.5 | 0.5 | 0.5 | 0.5 |
| Dicyandiamide | g | 8 | 6.4 | 6.4 | 6.4 | 6.4 | 6.4 | 6.4 |
| Fujicure1121[7] | g | 7 | 5.6 | 5.6 | 5.6 | 5.6 | 5.6 | 5.6 |
| Triphenyl phosphite | g |  |  | 10 | 15 | 20 |  |  |
| Triphenyl phosphate |  |  |  |  |  |  | 10 |  |
| Tricresyl phosphate |  |  |  |  |  |  |  | 10 |
| Viscosity/25° C. | Pa·s | 27.3 | 74.4 | 33.7 | 23.9 | 19.5 | 41.5 | 37.2 |
| Flexural modulus[6] | GPa | 2.9 | 7.8 | 9.2 | 9.4 | 9.2 | 8.8 | 8.9 |
| Flexural strength[6] | MPa | 89 | 149 | 169 | 175 | 172 | 160 | 164 |

[1] PAN based, Fiber diameter 7 μm, Average fiber length 100 μm
[2] Urea-modified liquid rheological agent
[4] Hydrophobic fumed silica (Average diameter of primary particle: about 16 nm)
[7] Imidazole-based curing agent manufactured by T & K TOKA
[6] Curing conditions: 60° C. × 1 hr→150° C. × 1 hr The viscosity was decreased by adding phosphite ester, or phosphate ester, and thus the flexural modulus and flexural strength were improved.

INDUSTRIAL APPLICABILITY

The curable epoxide composition can be used in the coating material, adhesive, or molded body in which the physical properties are improved.

The invention claimed is:

1. A molded body comprising a curable epoxide composition, wherein the curable epoxide composition comprises an epoxide compound; 1 to 40% by weight of a carbon fiber; a curing agent; and phosphite ester or phosphate ester.

2. The molded body according to claim 1, wherein an average fiber length of the carbon fiber is 20 μm to 1 mm.

3. The molded body according to claim 1, wherein an amount of phosphite ester or phosphate ester is 2 to 40% by weight.

4. The molded body according to claim 1, wherein the curable epoxide composition further comprises a fumed silica and/or a rheological agent.

* * * * *